United States Patent [19]

Serafin et al.

[11] 4,405,372

[45] Sep. 20, 1983

[54] GYPSUM-FREE CEMENT COMPOSITIONS

[75] Inventors: Frank G. Serafin, Peabody; Robert W. Previte, Lawrence, both of Mass.; Nathan R. Greening, Ft. Collins, Colo.; David L. Kantro, Aurora, Ohio; Fulvio J. Tang, Mundelein, Ill.

[73] Assignee: W. R. Grace & Co., Cambridge, Mass.

[21] Appl. No.: 355,486

[22] Filed: Mar. 8, 1982

[51] Int. Cl.$^3$ .................................................. C04B 7/35
[52] U.S. Cl. ........................................ 106/90; 106/97; 106/315
[58] Field of Search ................................ 106/90, 97, 315

[56] References Cited

U.S. PATENT DOCUMENTS

| | | | |
|---|---|---|---|
| 1,848,934 | 3/1932 | Case | 106/25 |
| 2,646,360 | 7/1953 | Lea | 106/90 |
| 2,880,102 | 3/1959 | Woodard et al. | 106/90 |
| 3,144,347 | 8/1964 | Cowan, Jr. | 106/90 |
| 3,210,207 | 10/1965 | Dodson et al. | 106/90 |
| 3,329,517 | 7/1967 | Dodson et al. | 106/315 |
| 3,489,582 | 1/1970 | Lindgren et al. | 106/97 |
| 3,619,221 | 11/1971 | Kossivas | 106/90 |
| 3,689,295 | 9/1972 | Hersey et al. | 106/315 |
| 3,884,710 | 5/1975 | Allen et al. | 106/89 |
| 3,960,582 | 6/1976 | Ball et al. | 106/90 |
| 4,066,469 | 1/1978 | Shiel et al. | 106/89 |

FOREIGN PATENT DOCUMENTS

| | | | |
|---|---|---|---|
| 950446 | 10/1956 | Fed. Rep. of Germany | 106/90 |
| 1387075 | 3/1975 | United Kingdom | 106/89 |

OTHER PUBLICATIONS

Limestone Substitutes for Gypsum as a Cement Ingredient, Rock Products—G. B. Bobrowski et al., Feb. 1977, pp. 64–67.

*Primary Examiner*—James Poer
*Attorney, Agent, or Firm*—John J. Wasatonic; William L. Baker

[57] ABSTRACT

Disclosed herein are gypsum-free cement compositions comprising portland cement, limestone and an amine salt of formic or acetic acid. The compositions exhibit compressive strength comparable to ordinary portland cement compositions containing gypsum and the setting properties of the compositions can be regulated.

17 Claims, No Drawings

GYPSUM-FREE CEMENT COMPOSITIONS

BACKGROUND OF THE INVENTION

Normally, portland cements are manufactured by burning an intimately blended mixture of calcareous and argillaceous raw materials to form a clinker and intergrinding the clinker with a small proportion of gypsum to a fine powder. The gypsum is conventionally employed to retard, and thus provide a measure of control over the setting time of the cement when combined with water.

Certain disadvantages are associated with the use of gypsum as a retarder of setting time, e.g., high water demand, particularly when the gypsum contains clay, which also interferes with the retarding characteristics; and a tendency to produce false set because of the formation of hemi-hydrate under the influence of heat developed during milling.

Patents which provide relevant background for the invention include the following. U.S. Pat. No. 4,066,469 describes ultra-rapid hardening cement compounds which do not contain gypsum. In these compounds, an alkali metal or ammonium acid salt is employed as an additive to control the setting rate. Additionally, the composition contains calcium lignosulfonate.

U.S. Pat. No. 3,619,221 describes the use of water-soluble salts of amines and formic acid to accelerate the setting times of cement compositions. Advantageously, the amine salts can be employed in combination with conventional set retarding agents.

U.S. Pat. No. 3,884,710 describes the conventional use of gypsum and at column 3, lines 66–68 it is indicated that gypsum may be used as a set regulator in conventional cements.

U.S. Pat. No. 3,960,582 describes a low-porosity free-flowing cement base which does not contain gypsum. The gypsum is replaced by a combination of alkali bicarbonate with a lignosulfonate of sulfonated lignin. The patent also describes the use of conventional water-reducer/set-retarding agents such as carbohydrates and hydroxy acids like sodium gluconate.

U.S. Pat. No. 1,848,934 describes addition of ground limestone to portland cement clinker to produce an inexpensive cement. The patent also describes adding retarders if it is desired to produce a slow setting cement.

U.S. Pat. No. 2,880,102 describes the use of mixtures of clay and ammonium salts of carboxylic acids as additives to cement compositions not generally containing gypsum. U.S. Pat. No. 3,144,347 discloses the use of amine salts of hydroxy acetic or lactic acid as cement additives. German DT-PS 950446 discloses the use of calcium formate in cement compositions as a replacement for gypsum. The use of calcium formate is also disclosed in DT-AS 1232861. U.S. Pat. No. 2,646,360 describes addition of ground limestone to cement compositions.

DESCRIPTION OF THE INVENTION

The invention is a gypsum-free portland cement composition comprising a portland cement clinker having from 1 to 10 weight % of limestone (preferably 2 to 6 weight %) interground therewith to provide a specific surface area (Blaine) of from 3000 to 7000 cm$^2$/g, and a water-soluble amine salt. The weight % of limestone employed is based upon the combined weight of the clinker and limestone. From about 0.005 to 1% (preferably 0.02 to 0.5%) of the amine salt is employed based upon the weight of the clinker. The salt is formed by reaction between an amine and formic or acetic acid. The gypsum-free compositions exhibit a compressive strength comparable to ordinary portland cement containing gypsum. Also, the setting properties of the cement can be regulated by use of the amine salt alone or in conjunction with set retarding agents. The amine salt is combined with the cement and limestone components prior to intergrinding, during the intergrinding process or subsequent thereto.

The water-soluble formate or acetate salts employed in the invention are obtained by adding formic or acetic acid to the amine, or the amine to the acid at, for example, room temperature until a substantially neutral reaction product i.e., a pH of about 7, is obtained. It should be understood that while formation of the water-soluble salt is the primary and predominant product of the reaction, some formation of an amide of the amine and the acid is probable, either initially during the reaction or upon standing of the reaction product over a period of time, and thus the salt may contain a minor amount of amide in some instances.

The amines employed to form the additive of the invention should be capable of forming a water-soluble salt with formic or acetic acid. The amines generally may contain up to about 20, preferably from 3 to about 10 carbon atoms in their structural formula. Suitable amines for use in preparing the amine salts of the invention include hydroxylated primary, secondary and tertiary aliphatic mono- and polyamines, for example, triethanol amine, diethanol amine, monoethanol amine, monoisopropanol amine, triisopropanol amine, tri-n-hexanol amine, and didecanol amine. Also included are hydroxylated polyamines which can be formed for example, by reacting ethylene oxide with ethylene diamine, diethylene triamine, triethylene tetramine and 1,3-dipropyl amine. Generally, the ratio of carbon atoms to O atoms in the mono or polyamines is from 2 to 3 and the ratio of OH/N groups is from 1 to 3. Mixtures of the foregoing such as residue products resulting from the commercial production of pure or essentially pure amines are also desirable for use in preparing the amine salts of the invention due to the relatively low cost of such products.

To further control the setting rate of cement compositions of the invention, the amine salts can be employed in combination with water-reducing agents. Any of the known water-soluble, water-reducing set-retarding agents can be employed in combination with the additive of the invention including carbohydrates such as monosaccharides, for example, glucose and fructose, disaccharides, for example, lactose and sucrose, trisaccharides, for example, raffinose, polysaccharides, for example, starch and cellulose, as well as derivatives thereof such as pregelatinized starch, dextrin corn syrup and carboxymethylcellulose; polyhydroxy polycarboxylic compounds such as tartaric acid and mucic acid; lignosulfonic acid and salts thereof such as calcium, magnesium, ammonium and sodium lignosulfonate; water-soluble salts of boric acid, such as the alkali metal salts thereof; and water-soluble silicone compounds, as well as mixtures thereof, the aforementioned water-reducing agents are generally employed in the art in an amount ranging between about 0.01 and 10 and most often between about 0.1 and 3 weight percent based upon the weight of the dry cement.

EXAMPLE I

The following examples illustrate use of the invention to provide setting times comparable to the use of gypsum while also providing acceptable compressive strengths. Portland cement clinker having the composition set forth in Table I below was interground with various additives to provide a series of cement compositions shown in Table II. Each composition was ground to substantially the same surface area (fineness). The surface area (Blaine), amounts and type of additives are set forth in Table II below. The test results were obtained by admixing the cement with 50% by weight of water and casting the resulting paste into cubes measuring 1 inch on a side. The setting times (Vicat test, ASTM C-191, modified) and compressive strengths were determined and are set forth in Table II below. For comparison a "standard" Portland cement produced by intergrinding the clinker with the usual amount of gypsum was included as a "control".

TABLE I

| Composition of Portland Cement Clinker | |
|---|---|
| Component | Weight % |
| CaO | 67.26 |
| SiO$_2$ | 21.47 |
| Al$_2$O$_3$ | 6.19 |
| Fe$_2$O$_3$ | 2.54 |
| MgO | 1.26 |
| Free CaO | 1.02 |
| Loss on ignition | 0.41 |
| Na$_2$O | 0.14 |
| K$_2$O | 0.14 |
| SO$_3$ | 0.08 | mate, 11% corn syrup polymer and 3% formaldehyde with the balance water having a pH adjusted to 7.5. The additive labeled "GL-301" in Example 5 consists essentially of 70% soy protein concentrate and is distributed by Griffith Laboratory, Chicago, Ill.

In Table II, the Composition 1 containing limestone in place of gypsum showed a significant reduction in 1 and 28 day compressive strengths and an increase in the setting time. In Composition 2, the limestone has been supplemented with a small amount of triethanol amine formate which produced more normal setting time and increased compressive strengths. The setting time and compressive strengths of Composition 2 compare favorably with the control. Similar observations apply to Composition 3. In Compositions 4 and 5 the WRG-1000 was intentionally selected to retard set. Compositions 4 and 5 also exhibit satisfactory compressive strengths when compared with the Control.

EXAMPLE II

In experiments similar to Example I, several cement compositions were prepared by intergrinding Portland cement clinker and various additives as in Example I, and the Blaine surface areas, setting times and compressive strengths of the hydrated compositions noted. The compositions and test results are shown in Table III. In Table III; two "controls" are shown, (Nos. 1 and 2), using the typical 5.5% gypsum as an additive. In a first series (Nos. 3–6) various compositions were prepared using varying amounts of limestone. In Series 2, limestone and 0.05% triethanolamine formate were used as additives. In Series 3, limestone and triethanolamine acetate were the additives, and in Series 4 limestone and

TABLE II

| | | Setting Time and Compressive Strength | | | | | |
|---|---|---|---|---|---|---|---|
| | | Blaine Surface | Setting | Compressive Strength (psi) | | | |
| Composition | Additive | Area (cm$^2$/g) | Time (Hours) | 1 day | 3 days | 7 days | 28 days |
| Control | 5.5% gypsum | 3430 | 5.08 | 1190 | 3700 | 6950 | 10050 |
| 1 | 5.0% limestone | 3420 | 7 | 700 | 4400 | 6550 | 8320 |
| 2 | 5.0% limestone 0.05% triethanolamine formate | 3380 | 5 | 2400 | 7100 | 9100 | 10250 |
| 3 | 5.0% limestone 0.054% triethanolamine acetate | 3388 | 4 | 2125 | 6400 | 8850 | 9900 |
| 4 | 5.0% limestone 0.10% WRG-1000 | 3420 | 7 | 1040 | 6000 | 7700 | 10050 |
| 5 | 5.0% limestone 0.05% WRG-1000 0.025% GL-301 | 3370 | 6 | 1110 | 5400 | 7350 | 9700 |

In compositions 4 and 5 of Table II, the additive designated "WRG-1000" is an admixture comprising 23% calcium lignosulfonate, 7% triethanol amine formate, calcium formate (not an additive according to the invention) were used for comparative purposes.

TABLE III

| | | Properties of Cement Pastes | | | | | |
|---|---|---|---|---|---|---|---|
| | | | Setting | Compressive Strength | | | |
| | Additive | Blaine Surface | Time (Hours) | 1 day | 3 days | 7 days | 28 days |
| Controls | | | | | | | |
| 1 | 5.5% gypsum | 3430 | 5.08 | 1190 | 3700 | 6950 | 10050 |
| 2 | 5.5% gypsum | 3450 | 4.75 | 1320 | 3750 | 7100 | 10700 |
| SERIES 1 | | | | | | | |
| 3 | 0.0% limestone | 3410 | *** | 60 | 4000 | 6920 | 8480 |
| 4 | 2.5% limestone | 3410 | 6.47 | 620 | 3500 | 5750 | 5880 |
| 5 | 5.0% limestone | 3420 | 7 | 700 | 4400 | 6550 | 8320 |
| 6 | 10.0% limestone | 3440 | 7.58 | 410 | 2680 | 4820 | 6850 |
| SERIES 2: | 0.05% triethanolamine formate | | | | | | |
| 7 | 0.0% limestone | 3430 | *** | ** | 4020 | 6400 | 7000 |
| 8 | 2.5% limestone | 3420 | *** | 1050 | 5950 | 8150 | 10050 |

TABLE III-continued

| | | | Properties of Cement Pastes | | | | | |
|---|---|---|---|---|---|---|---|---|
| | | | Blaine Surface | Setting Time (Hours) | Compressive Strength | | | |
| | Additive | | | | 1 day | 3 days | 7 days | 28 days |
| 9 | 5.0% limestone | | 3388 | 5 | 2125 | 7100 | 9100 | 10250 |
| 10 | 10.0% limestone | | 3410 | 3.60 | 1900 | 3550 | 7400 | 8750 |
| SERIES 3: | .054% triethanolamine acetate | | | | | | | |
| 11 | 0.0% limestone | | 3400 | *** | ** | 4000 | 5800 | 6025 |
| 12 | 2.5% limestone | | 3430 | *** | 950 | 5420 | 8450 | 9350* |
| 13 | 5.0% limestone | | 3380 | 4 | 2720 | 6400* | 8850 | 9900* |
| 14 | 10.0% limestone | | 3430 | 4.73 | 2150 | 6300 | 8000 | 9400 |
| SERIES 4: | .033% calcium formate | | | | | | | |
| 15 | 0.0% limestone | | 3430 | *** | 180 | 3250 | 5200 | 7400 |
| 16 | 2.5% limestone | | 3439 | 6.43 | 1010 | 3900 | 6700 | 7850 |
| 17 | 5.0% limestone | | 3450 | 6.17 | 660 | 3650 | 5650 | 7700 |
| 18 | 10.0% limestone | | 3420 | 6.37 | 440 | 2650 | 4600 | 6200 |

Notes:
*Single determination; second cube flawed
**Less than 50 psi strength
***Setting time longer than 8 hours, but less than 24 hours

EXAMPLE III

A series of mortar compositions (1-3, Tables VI-VIII) were prepared by intergrinding limestone and Portland cement clinker. In one run, gypsum was used rather than limestone. The ground solids were admixed with sand and an aqueous solution designated as "M2A" which contained 42.5 weight % solids formed by reacting approximately 9 parts of triethanol amine and 1 part of diethanol amine with formic acid. It is probable that other amine salts were preset in the M2A at solids levels of less than about 0.5%. The paste composition was tested for setting time according to ASTM C187, C191, and C266. The compressive strengths were tested for according to ASTM C109. The ingredients employed as well as the setting times and compressive strengths are set forth in Table VI below. It is probable that the setting times of Compositions 2 and 3 can be prolonged by using the acetate salt rather than the formate salt or by increasing the content of monoethanol amine and diethanol amine salts in the M2A. Also, conventional set retarding agents (e.g., calcium lignosulfonate) could be employed. In Table VII, the degree of shrinkage exhibited by the Compositions 1-3 is shown. In Table VIII, the Compositions were tested for false set according to ASTM C359.

TABLE VI

| Composition | Additive | Blaine Surface Area (cm²/g) | % M2A Solids | Vicat Set Initial | Vicat Set Final | Gillmore Set Initial | Gillmore Set Final | Compressive Strength (psi) 1 day | 3 days | 7 days | 28 days |
|---|---|---|---|---|---|---|---|---|---|---|---|
| 1 | 5.5% gypsum | 3360 | 0.0 | 1:15 | 2:00 | 2:05 | 3:10 | 1490 | 3460 | 5250 | 6790 |
| 2 | 5% limestone | 3390 | 0.025 | 0:15 | 0:30 | 1:00 | 4:10 | 820 | 3750 | 4930 | 4740 |
| 3 | 5% limestone | 3370 | 0.050 | 0:05 | 0:20 | 0:20 | 0:55 | 1050 | 3210 | 5150 | 5120 |

TABLE VII

| Composition | W/C | Flow | Percent Shrinkage* 1 wk. | 2 wks. | 3 wks. | 4 wks. | Ultimate |
|---|---|---|---|---|---|---|---|
| 1 | .395 | 109 | 0.0414 | 0.0670 | 0.0795 | 0.0821 | 0.105 |
| 2 | .405 | 110 | 0.132 | 0.186 | 0.205 | 0.209 | 0.245 |
| 3 | .475 | 107 | 0.140 | 0.199 | 0.224 | 0.230 | 0.274 |

*Drying Shrinkage Tests According to ASTM C596

TABLE VIII

| | Penetration* (Millimeters) | | | | |
|---|---|---|---|---|---|
| Composition | Initial | 5 min. | 8 min. | 11 min. | Remix |
| 1 | 50+ | 50+ | 50 | 49 | 49 |
| 2 | 9 | 0 | 0 | 0 | 4 |
| 3 | 0 | 0 | 0 | 0 | 0 |

*False Set Test (Mortar) According To ASTM C359

What is claimed is:

1. A gypsum-free cement composition exhibiting a compressive strength comparable to ordinary portland cement containing gypsum, and with setting properties which can be regulated, said composition comprising a portland cement clinker having from 1 to 10 weight % of limestone interground therewith to exhibit a specific surface area of from 3000 to 7000 cm²/g, and a water-soluble amine salt in an amount of from 0.005 to 1% by weight of said clinker, said salt formed by reaction between an amine and formic or acetic acid.

2. A composition as in claim 1 wherein the amine contains up to 20 carbon atoms.

3. A composition as in claim 1 wherein the amine is triethanol amine.

4. A composition as in claim 1 where an acetate salt is employed.

5. A composition as in claim 1 where a formate salt is employed.

6. A composition as in claim 1 including incorporating a water-soluble, water-reducing, set retarding agent in said composition.

7. A method of making a gypsum-free cement composition exhibiting compressive strength comparable to ordinary portland cement containing gypsum and with setting properties which can be regulated, said method comprising intergrinding portland cement clinker in the presence of from 1 to 10% by weight of limestone to provide a cement having a specific surface area of from 3000 to 7000 cm$^2$/g and controlling the setting time of said composition by incorporating therein a water-soluble amine salt in an amount of from 0.05 to 1% by weight of said clinker, said salt formed by reaction between an amine and formic or acetic acid.

8. A method as in claim 7 wherein the amine contains up to 20 carbon atoms.

9. A method as in claim 7 wherein the amine is triethanol amine.

10. A method as in claim 7 where an acetate salt is employed.

11. A method as in claim 7 where a formate salt is employed.

12. A method as in claim 7 wherein the amine salt is incorporated following intergrinding of the portland cement clinker and limestone.

13. A method as in claim 7 wherein the amine salt is interground with the limestone and portland cement clinker.

14. A method as in claim 7 including incoporating a water-soluble water-reducing, set retarding agent in said composition.

15. A gypsum-free cement composition exhibiting acceptable compressive strength and controllable setting properties prepared according to the method of claim 6.

16. A settable portland cement composition exhibiting compressive strength comparable to ordinary portland cement containing gypsum, and with setting properties which can be regulated, said composition comprising water, an inert aggregate, a portland cement clinker having from 1 to 10% by weight of limestone interground therewith to exhibit a specific surface area of from 3000 to 7000 cm$^2$/g, and a water-soluble amine salt in an amount of from 0.005 to 1% by weight of said clinker, said salt formed by reaction between an amine and formic or acetic acid.

17. A composition as in claim 6 wherein the amine contains up to 20 carbon atoms.

* * * * *